United States Patent
Zhao et al.

(10) Patent No.: US 12,534,829 B2
(45) Date of Patent: Jan. 27, 2026

(54) ULTRA-LOW DENSITY AEROGEL-BASED MATERIAL AND METHOD OF MANUFACTURE

(71) Applicant: Ford Global Technologies, LLC, Dearborn, MI (US)

(72) Inventors: Haibo Zhao, Northville, MI (US); Deborah Frances Mielewski, Ann Arbor, MI (US); Bhaskara Rao Boddakayala, Troy, MI (US); Alper Kiziltas, Sarikamis (AR)

(73) Assignee: Ford Global Technologies, LLC, Dearborn, MI (US)

( * ) Notice: Subject to any disclaimer, the term of this patent is extended or adjusted under 35 U.S.C. 154(b) by 778 days.

(21) Appl. No.: 17/872,312

(22) Filed: Jul. 25, 2022

(65) Prior Publication Data
US 2024/0026574 A1    Jan. 25, 2024

(51) Int. Cl.
*D01F 9/08*    (2006.01)
*C23C 30/00*    (2006.01)

(52) U.S. Cl.
CPC ............. *D01F 9/08* (2013.01); *C23C 30/00* (2013.01)

(58) Field of Classification Search
None
See application file for complete search history.

(56) References Cited

U.S. PATENT DOCUMENTS

| | | | |
|---|---|---|---|
| 6,764,667 | B1 | 7/2004 | Steiner, III |
| 10,464,816 | B2 | 11/2019 | Oh et al. |
| 2021/0332270 | A1 | 10/2021 | Chen et al. |
| 2022/0098046 | A1 | 3/2022 | Lee et al. |

FOREIGN PATENT DOCUMENTS

CN    112142058    12/2020

OTHER PUBLICATIONS

Timusk et al., Aerogel-like silica powders by combustions of sol-gel derived alcogels, Microporous and mesoporous materials, 2021 (Timusk) (Year: 2021).*

* cited by examiner

*Primary Examiner* — Keling Zhang
(74) *Attorney, Agent, or Firm* — Burris Law, PLLC

(57) ABSTRACT

A method of producing an aerogel-based material includes placing a sol mixture into a cavity of a tool. The sol mixture includes a precursor and a solvent. The cavity of the tool is sealed and the sol mixture is heated under pressure to at least supercritical conditions, thereby creating a flammable gas within the cavity of the tool. The flammable gas within the cavity of the tool is ignited.

17 Claims, 6 Drawing Sheets

ULTRA-LOW DENSITY AEROGEL-BASED MATERIAL AND METHOD OF MANUFACTURE

FIELD

The present disclosure relates to aerogel-based materials and methods of manufacturing the same.

BACKGROUND

The statements in this section merely provide background information related to the present disclosure and may not constitute prior art.

Materials such as aerogels with desired thermal insulating properties are used as thermal barriers to mitigate thermal runaway in, for example, battery electric vehicles (BEVs). However, traditional materials are generally higher in density, lack flexibility and extensibility, and have fragile structures. Furthermore, added weight in vehicle parts is undesirable and can lead to reduced fuel economy and overall vehicle performance.

The present disclosure addresses these and other issues related to the use of aerogel-based materials.

SUMMARY

This section provides a general summary of the disclosure and is not a comprehensive disclosure of its full scope or all of its features.

According to one form of the present disclosure, a method of producing an aerogel-based material includes placing a sol mixture into a cavity of a tool. The sol mixture includes a precursor and a solvent. The cavity of the tool is sealed and the sol mixture is heated under pressure to at least supercritical conditions, thereby creating a flammable gas within the cavity of the tool. The flammable gas within the cavity of the tool is ignited.

In variations of this form, which may be implemented individually or in any combination: the flammable gas is ignited by generating an electrical voltage within the cavity of the tool; a cathode and an anode are spaced a distance apart within the cavity of the tool, wherein the electrical voltage is passed between the cathode and the anode; a piezo igniter is disposed within the cavity of the tool, wherein the electrical voltage is generated by the piezo igniter; the solvent includes at least one of ethanol and methanol; the precursor is selected from the group including silica, alumina, titania, hafnium carbide, polymers, and chalcogenide semiconductors; the aerogel material includes silicon and oxygen at an atomic ratio between about 1:1 to about 1:2; the method further includes spinning the aerogel-based material into fibers; the method further includes coating the aerogel-based material with a conductive material; the conductive material is copper; and a part includes the aerogel-based material.

According to another form of the present disclosure, a method of producing an aerogel-based material includes placing a sol mixture into a cavity of a tool. The sol mixture includes a precursor and a solvent. The cavity of the tool is sealed and the sol mixture is heated under pressure to at least supercritical conditions, thereby creating a flammable gas within the cavity of the tool. An electrical voltage is generated within the cavity of the tool, thereby igniting the flammable gas within the cavity of the tool.

In variations of this form, which may be implemented individually or in any combination: a cathode and an anode are spaced a distance apart within the cavity of the tool, wherein the electrical voltage is passed between the cathode and the anode; a piezo igniter is disposed within the cavity of the tool, wherein the electrical voltage is generated by the piezo igniter; the precursor is selected from the group including silica, alumina, titania, hafnium carbide, polymers, and chalcogenide semiconductors; the aerogel-based material includes silicon and oxygen at an atomic ratio between about 1:1 to about 1:2; the method further includes spinning the aerogel-based material into fibers; and the method further includes coating the aerogel-based material with a conductive material.

According to yet another form of the present disclosure, a composite material reinforced with fibers is formed according to the method including placing a sol mixture into a cavity of a tool. The sol mixture includes a precursor and a solvent. The cavity of the tool is sealed and the sol mixture is heated under pressure to at least supercritical conditions, thereby creating a flammable gas within the cavity of the tool. An electrical voltage is generated within the cavity of the tool, thereby igniting the flammable gas within the cavity of the tool to create an aerogel-based material. The aerogel-based material is spun into fibers.

In a variation of this form, the precursor is selected from the group including silica, alumina, titania, hafnium carbide, polymers, and chalcogenide semiconductors.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
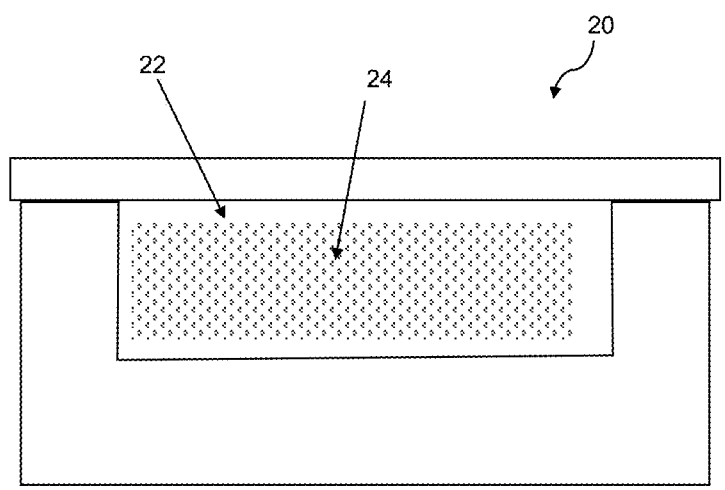
FIG. 1 illustrates a sealed tool with a sol mixture in a cavity of the tool according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a method for producing a light-weight, "cotton-like" aerogel-based material. The aerogel-based material produced according to the method of the present application is light-weight and has an ultra-low-density such that it floats in the air with a moderate amount of airflow. While the aerogel-based material is heavier than air, the inventors have discovered that the aerogel-based material does in fact float and move with a certain amount of airflow.

Referring to FIG. 1, a tool for producing the aerogel-based material is illustrated and generally indicated by reference number 20. The tool 20 comprises a cavity 22 which is configured to be filled with a sol mixture 24. The shape and dimensions of the tool 20 and the cavity 22 are for illustrative purposes only and are not intended to limit the scope of the present disclosure. Accordingly, the tool 20 and the cavity 22 may take any appropriate shape and dimensions to facilitate a specific part geometry, or part geometries, being manufactured.

Generally, the sol mixture 24 is placed within the cavity 22 of the tool and is heated under pressure until the sol mixture reaches at least supercritical conditions. By heating the sol mixture 24 under pressure to at least supercritical conditions, a flammable gas is created within the cavity 22 of the tool 20. The inventors have discovered that ignition of the flammable gas within the cavity 22 of the tool 20 creates the innovative light-weight, "cotton-like" aerogel-based material as set forth in greater detail below.

Figure 2:
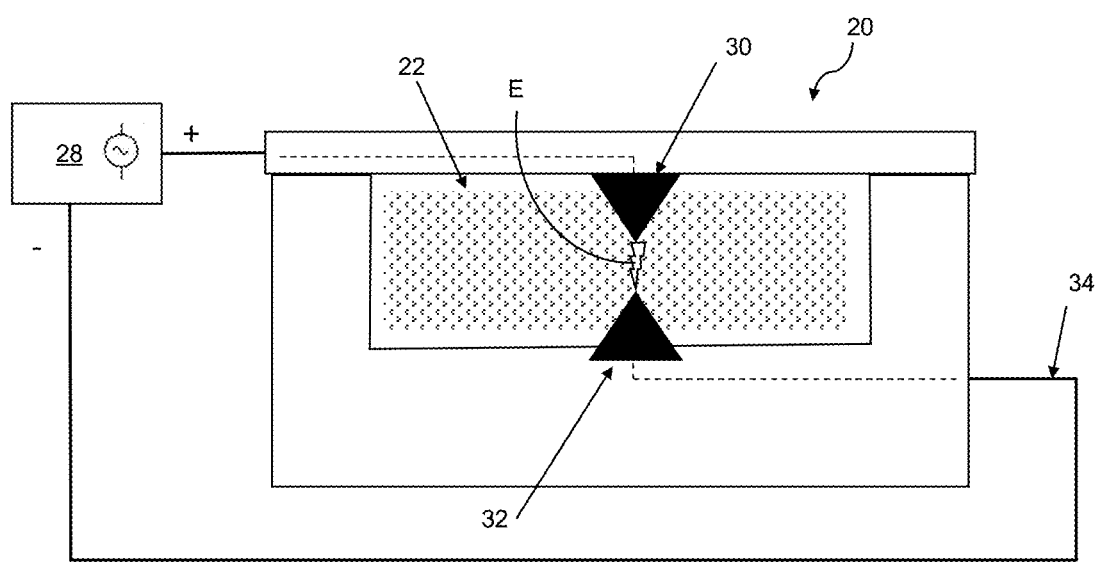
FIG. 2 illustrates the sealed tool of FIG. 1 further including a high voltage supply line, a ground line, and a pair of steel tips configured to ignite a flammable gas within the cavity of the tool.

Referring to FIG. 2, one form of the present disclosure includes generating an electrical voltage within the cavity 22 of the tool 20 to ignite the flammable gas. In this form, a voltage supply 28 (which may be AC or DC) is connected to a cathode 30 disposed within the cavity 22 of the tool 20. Opposite the cathode 30, an anode 32 is also disposed within the cavity 22 of the tool 20 and spaced a distance apart from the cathode 30. Further, a ground line 34 (or power return) connects the anode 32 back to the voltage supply 28. When an electrical voltage is applied at a high enough level, an electrical arc "E" jumps from the tip of the cathode 30 to the tip of the anode 32, thereby creating an ignition source to ignite the flammable gas.

In another variation not shown, a piezo igniter may be disposed within the cavity 22 of the tool 20 to ignite the flammable gas. In another form, the flammable gas is ignited with pressure and/or additional additives rather than an electrical voltage. These and other means by which to ignite the flammable gas within the cavity 22 of the tool 20 should be construed as falling within the scope of the present disclosure.

Figure 3:
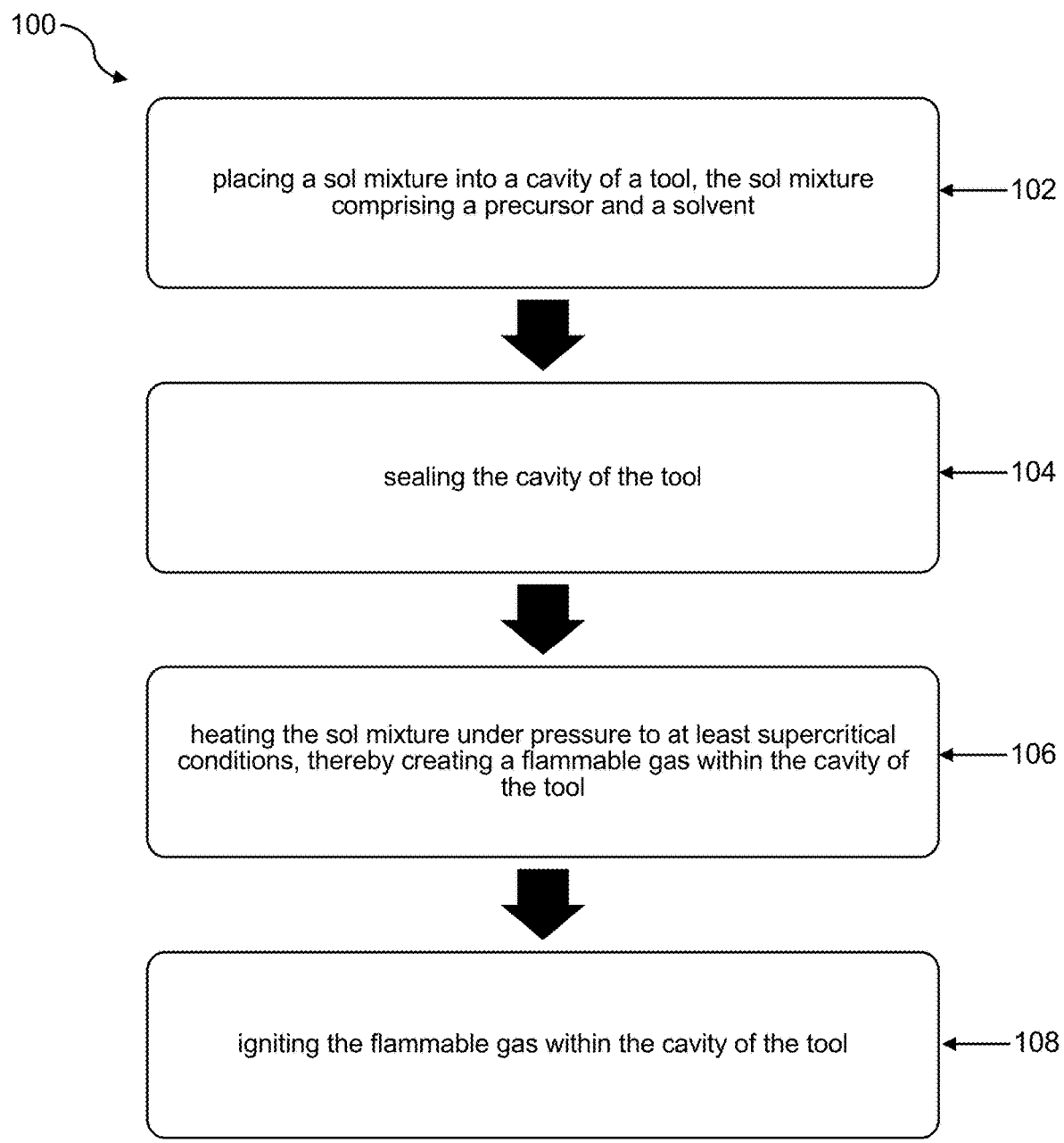
FIG. 3 is a flowchart of a method of producing an aerogel-based material according to the present disclosure.

Referring now to FIG. 3, a method for producing the innovative aerogel-based material is illustrated and generally indicated by reference numeral 100. The method 100 comprises placing the sol mixture 24 into the cavity 22 of the tool 20 at step 102. The sol mixture 24 comprises a precursor and a solvent, and in one form of the present disclosure the solvent is at least one of methanol and ethanol. The aerogel material comprises a precursor selected from the group consisting of silica, alumina, titania, hafnium carbide, polymers, and chalcogenide semiconductors. However, it should be understood that other solvents and precursors may be employed while remaining within the scope of the present disclosure. Further, before placing the sol mixture 24 into the cavity 22, the cavity 22 is optionally coated with a mold-release agent to assist with removal of the aerogel-based material after processing.

By way of non-limiting example, in one form of the present disclosure the sol mixture 24 comprises about 15.5 mL of tetraethylorthosilicate (TEOS), about 20 mL of absolute ethanol (Abs. EtOH), about 0.5 mL of water, and about 6 mL of 0.01M oxalic acid. These components are combined to form a mixture and the mixture is stirred for about 15 minutes. The mixture is then allowed to rest for about 45 minutes. About 0.5. mL of 0.325M ammonium hydroxide is then added to the mixture and the resultant mixture (i.e., sol mixture 24) is then mixed for about 1-2 minutes before being transferred into the cavity 22.

At step 104, the cavity 22 of the tool 20 is sealed by, for example, a hydraulic press or mechanical fasteners such as bolts, among others (not shown). The sealed tool 20 is then heated, at step 106, until the solvent reaches at least supercritical conditions. The heating is accomplished using, for example, a heating coil wrapped around the tool 20, infrared radiation, or by placing the tool 20 in an oven, among others (not shown). During heating, the sol mixture 24 undergoes gelation. By way of nonlimiting example, for ethanol, the supercritical conditions comprise a pressure greater than or equal to about 800 pounds per square inch (psi) and a temperature greater than or equal to about 290° C. As set forth above, the heating of the sol mixture 24 creates a flammable gas within the cavity 22 of the tool 20.

Once the temperature and pressure of the solvent reach supercritical conditions, the flammable gas within the cavity 22 of the tool 20 is ignited, at step 108. The ignition of the flammable gas within the cavity 22 of the tool 20 produces a controlled explosion within the cavity 22, which forms the innovative aerogel-based material according to the present disclosure.

Following ignition of the flammable gas, the tool 20 is allowed to cool and the aerogel-based material is then removed from the tool 20. In one form of the present disclosure, the aerogel-based material comprises silicon and oxygen at an atomic ratio between about 1:1 to about 1:2. In another form, the aerogel-based material comprises silicon and oxygen at an atomic ratio of about 3:5. The method 100 according to the present disclosure may further comprise spinning the aerogel-based material into fibers. The aerogel-based material may also optionally be coated with a conductive material such as copper, for example. The aerogel-based material produced according to the method 100 of the present disclosure may be used to manufacture parts such as rigid and flexible parts for vehicles, among others.

Figure 4A:
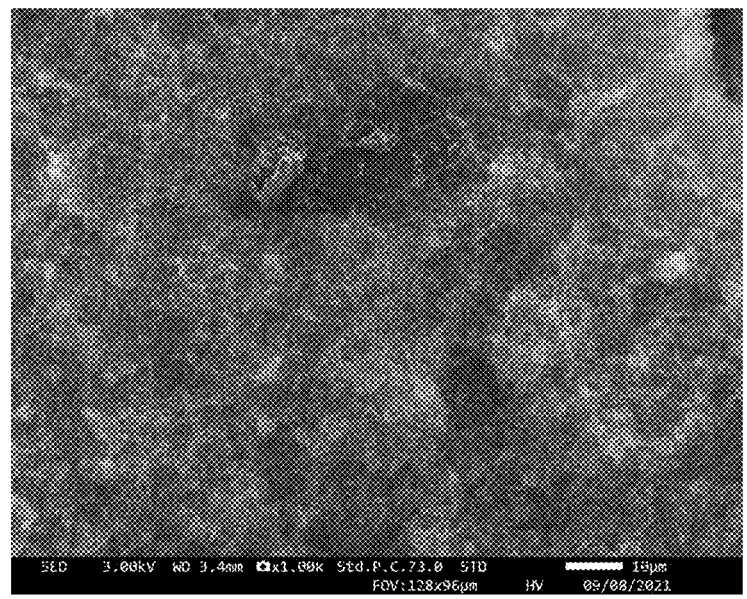
FIG. 4A is a scanning electron microscope (SEM) image of an aerogel-based material according to the present disclosure.
Figure 4B:
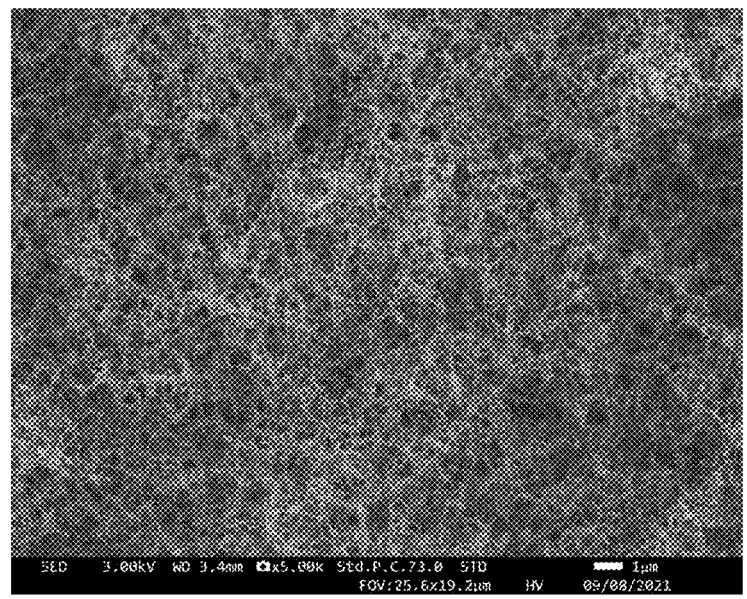
FIG. 4B is a scanning electron microscope (SEM) image of an aerogel-based material according to the present disclosure on an enlarged scale.
Figure 4C:
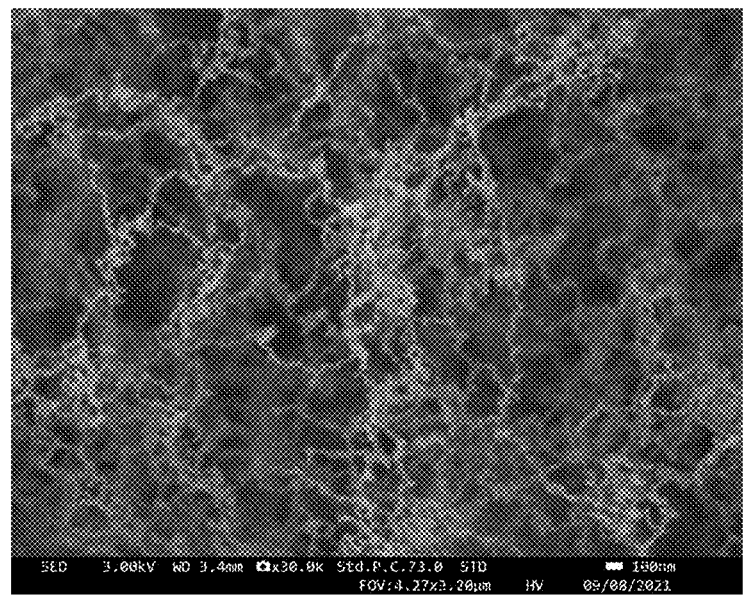
FIG. 4C is a scanning electron microscope (SEM) image of an aerogel-based material according to the present disclosure on an even more enlarged scale.

Referring now to FIGS. 4A-4C, scanning electron microscope (SEM) images depicting the nano structure of the aerogel-based material are shown at varying scales. In each of these images, the microstructure of interconnected fibers can be seen. This microstructure provides the desired properties (i.e., mechanical performance, flexibility, tensile strength, etc.) of the aerogel-based material, which has an ultra-low density. In one form of the present disclosure, the aerogel-based material has a density less than or equal to about 0.01 g/cm$^3$. In another form, the aerogel-based material has a density between about 0.002 g/cm$^3$ to about 0.01 g/cm$^3$.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of producing an aerogel-based material, the method comprising:
   placing a sol mixture into a cavity of a tool, the sol mixture comprising a precursor and a solvent;
   sealing the cavity of the tool;
   heating the sol mixture under pressure to at least supercritical conditions, thereby creating a flammable gas within the cavity of the tool; and
   igniting the flammable gas within the cavity of the tool.

2. The method according to claim 1, wherein the flammable gas is ignited by generating an electrical voltage within the cavity of the tool.

3. The method according to claim 2, further comprising a cathode and an anode spaced a distance apart within the cavity of the tool, wherein the electrical voltage is passed between the cathode and the anode.

4. The method according to claim 2, further comprising a piezo igniter disposed within the cavity of the tool, wherein the electrical voltage is generated by the piezo igniter.

5. The method according to claim 1, wherein the solvent comprises at least one of ethanol and methanol.

6. The method according to claim 1, wherein the precursor is selected from the group consisting of silica, alumina, titania, hafnium carbide, polymers, and chalcogenide semiconductors.

7. The method according to claim 1, wherein the aerogel-based material comprises silicon and oxygen at an atomic ratio between about 1:1 to about 1:2.

8. The method according to claim 1 further comprising spinning the aerogel-based material into fibers.

9. The method according to claim 1 further comprising coating the aerogel-based material with a conductive material.

10. The method according to claim 9, wherein the conductive material is copper.

11. A method of producing an aerogel-based material, the method comprising:
    placing a sol mixture into a cavity of a tool, the sol mixture comprising a precursor and a solvent;
    sealing the cavity of the tool;
    heating the sol mixture under pressure to at least supercritical conditions, thereby creating a flammable gas within the cavity of the tool; and
    generating an electrical voltage within the cavity of the tool, thereby igniting the flammable gas within the cavity of the tool.

12. The method according to claim 11, further comprising a cathode and an anode spaced a distance apart within the cavity of the tool, wherein the electrical voltage is passed between the cathode and the anode.

13. The method according to claim 11, further comprising a piezo igniter disposed within the cavity of the tool, wherein the electrical voltage is generated by the piezo igniter.

14. The method according to claim 11, wherein the precursor is selected from the group consisting of silica, alumina, titania, hafnium carbide, polymers, and chalcogenide semiconductors.

15. The method according to claim 11, wherein the aerogel-based material comprises silicon and oxygen at an atomic ratio between about 1:1 to about 1:2.

16. The method according to claim 11 further comprising spinning the aerogel-based material into fibers.

17. The method according to claim 11 further comprising coating the aerogel-based material with a conductive material.

* * * * *